United States Patent [19]

Yanagawa et al.

[11] Patent Number: 4,713,094
[45] Date of Patent: Dec. 15, 1987

[54] AIR DRIER APPARATUS

[75] Inventors: Ichiro Yanagawa; Yuji Wachi, both of Higashimatsuyama, Japan

[73] Assignee: Jidosha Kiki Co., Ltd., Japan

[21] Appl. No.: 900,316

[22] Filed: Aug. 25, 1986

[30] Foreign Application Priority Data

Aug. 28, 1985 [JP] Japan .............................. 60-130968[U]
Aug. 30, 1985 [JP] Japan .............................. 60-132681[U]
Aug. 30, 1985 [JP] Japan .................................. 132682[U]

[51] Int. Cl.$^4$ .............................................. B01D 53/04
[52] U.S. Cl. ....................................... 55/163; 55/218; 55/275; 55/316; 55/387; 55/DIG. 17
[58] Field of Search .................. 55/163, 218, 267, 274, 55/275, 316, 387, DIG. 17; 248/312.1, 313, 316.1, 316.6

[56] References Cited

U.S. PATENT DOCUMENTS

| 1,314,186 | 8/1919 | Dorstrom | 248/313 X |
| 1,492,443 | 4/1924 | Francis | 248/313 |
| 1,582,723 | 4/1926 | Ahlman | 248/313 |
| 1,911,380 | 5/1933 | McFarlin | 248/316.1 |
| 2,442,696 | 6/1948 | Krieck | 55/274 X |
| 2,458,329 | 1/1949 | Archer | 248/313 X |
| 2,512,210 | 6/1950 | McGrath | 248/313 X |
| 2,845,138 | 7/1958 | Gageby | 55/316 X |
| 2,930,445 | 3/1960 | Glass et al. | 55/316 |
| 3,212,660 | 10/1965 | Adell | 248/313 |
| 3,212,661 | 10/1965 | Adell | 248/313 |
| 3,464,186 | 9/1969 | Hankison et al. | 55/163 |
| 3,705,480 | 12/1972 | Wireman | 55/316 X |
| 3,714,763 | 2/1973 | Suzuki | 55/163 |
| 4,278,453 | 7/1981 | Klein | 55/275 |
| 4,487,617 | 12/1984 | Dienes et al. | 55/163 |
| 4,544,385 | 10/1985 | Tanaka | 55/218 X |
| 4,572,725 | 2/1986 | Kojima | 55/316 X |

FOREIGN PATENT DOCUMENTS

| 1089288 | 9/1960 | Fed. Rep. of Germany | 248/313 |
| 32920 | 2/1984 | Japan | 55/210 |
| 64616 | 4/1985 | Japan | 55/163 |
| 75321 | 4/1985 | Japan | 55/275 |

Primary Examiner—Robert Spitzer
Attorney, Agent, or Firm—McGlew and Tuttle

[57] ABSTRACT

An air drier apparatus including a housing having an open bottom end, a drying agent storage casing disposed within the housing and a bottom end cover blocking the open bottom end of the housing is provided with a securing plate member which is positioned within the bottom portion of the drying agent storage casing and has a lock nut incorporated thereon. A single bolt member engages the lock nut and secures the bottom portion of the storage casing to the bottom end cover. A moisture sensing member is disposed in position within either the housing or bottom end cover in such manner as to monitor the moisture content of the compressed air existing in a purge chamber defined between the housing and the drying agent storage casing. A belt-like fixing member is placed around the outer circumference of the housing for mounting the air drier apparatus. The housing is provided with an annular projection or recess mating snugly with a complementary annular recess or projection on the inner circumference of the belt-like fixing member.

11 Claims, 9 Drawing Figures

AIR DRIER APPARATUS

BACKGROUND OF THE INVENTION (i) Field of the Invention

The present invention relates to an air drier apparatus, and more particularly to an improvement relating to an air drier apparatus for drying compressed air for use in the pneumatic brake system of an automotive vehicle.

(ii) Description of the Prior Art

It has generally been known in the art of pneumatic brake system for use in an automotive vehicle that an air drier is employed to dry air supplied into the pneumatic brake system of an automotive vehicle. For example, there is known as this type of air drier apparatus such a typical construction as shown in FIG. 7, in which an air drier apparatus 100 comprises a housing 101 having an open end at the lower end portion thereof as viewed in FIG. 7, a storage casing 104 disposed in a purge chamber 102 defined within the housing 101 and adapted to enclose a desiccant or drying agent 103 therein, and an end cover 105 adapted to close the open end of the housing 101. This air drier apparatus 100 serves, at the compressed air charging stage on one hand, to relay compressed air from a compressor not shown to an air reservoir by way of a drying agent storage 106 housed in the storage casing 104, a check valve 107 and a purge chamber 102, and serves, at its drier regenerating stage on the other hand, to open a purge valve 108 provided in the end cover 105, thereby allowing compressed air within the purge chamber 102 to be discharged out of the drying agent storage 106 to the atmosphere.

Incidentally, according to a typical construction of a conventional drier apparatus, the drying agent storage casing is mounted in position to the end cover, for instance, by using four screws or the like. On the other hand, the air drier assembly 100 is generally mounted onto the vehicle's framework in such a manner as shown typically in FIG. 8 that for instance two band-like webs or fixing members 109 are used to wrap once around the circumference of the cylindrical housing 101, with the opposite ends 109' of the fixing members 109 being secured together by using such means as screws and nuts, and further being fixed securely using screws and nuts onto the vehicle's framework.

With such a typical construction, the following drawbacks have inevitably been observed in the mounting of the conventional air drier assembly.

Since the drying agent storage casing 104 is mounted in position to the end cover 105 with four screws or the like as noted above, it is then essential, when exchanging (in an overhaul work) the drying agent 103 within the casing, as it got deteriorated after use, to remove all the four screws, which therefore means an additional work for the dismounting of the storage casing.

On the other hand, the drying agent 103 stored in the inside of the drying agent storage casing 104 would have to be exchanged with new one, since it would get deteriorated to lose its hygroscopicity as the air drier apparatus repeats its cycles of compressed air charging and drying agent regeneration during the operation of the braking system, and thus the drying agent storage casing 104 should be replaced regularly or from a rule of thumb. When replacing the drying agent 103 at a regular service interval, it would sometimes be found still serviceable or not deteriorated yet. However, as the air drier apparatus 100 is of a double-shell structure as typically shown in FIG. 8, it would be possible for no one to observe the current state of deterioration of the drying agent 103 from the outside of the drying agent storage casing 104. In this respect, with such construction of the conventional air drier apparatus 100, it would then be inevitable that the drying agent storage casing 104 be replaced with the drying agent 103 being still serviceable, which is undesirable ecnomically.

With the mounting of the air drier apparatus 100 upon the vehicle's framework by way of the fixing members 109, it is apprehended that the air drier apparatus 100 would very possibly drop out of engagement with the fixing members 109 owing to aging thereof or looseness from vibrations of the vehicle during the operation. This is because the air drier apparatus 100 would be in danger of slipping with the mere effect of surface contact with the fixing members 109 forced by the fixing members 109 even if it is secured in position by tightening the two fixing members 109.

In consideration of such drawbacks particular to the conventional construction of mounting of the air drier apparatus as noted above, it would be desirable to attain an efficient resolution for overcoming such inevitable problems particular to the conventional construction.

SUMMARY OF THE INVENTION

The present invention is essentially directed to the provision of an improved air drier apparatus with a due resolution to such inconveniences and difficulties in practice as outlined above and experienced in the conventional manner of mounting of such air drier apparatus, which have been left unattended with any proper countermeasures therefor.

It is therefore an object of the present invention to provide an improved air drier apparatus in which the drying agent storage casing can be removed quickly and easily.

It is another object of the invention to provide an improved air drier apparatus which is quite simple in construction, yet ensuring the mount of the apparatus from slipping out of engagement.

Other objects and advantages of the invention will become apparent to those skilled in the art upon review and consideration of the following detailed description of a preferred embodiment exemplifying the best mode of carrying out the invention as presently perceived. The detailed description refers particularly to the accompanying drawings, in which like parts are designated at like reference numerals.

DETAILED DESCRIPTION OF PREFERRED EMBODIMENTS

The present invention will now be explained in practical terms by way of preferred embodiments thereof in conjunction with accompanying drawings herewith.

Figure 1:
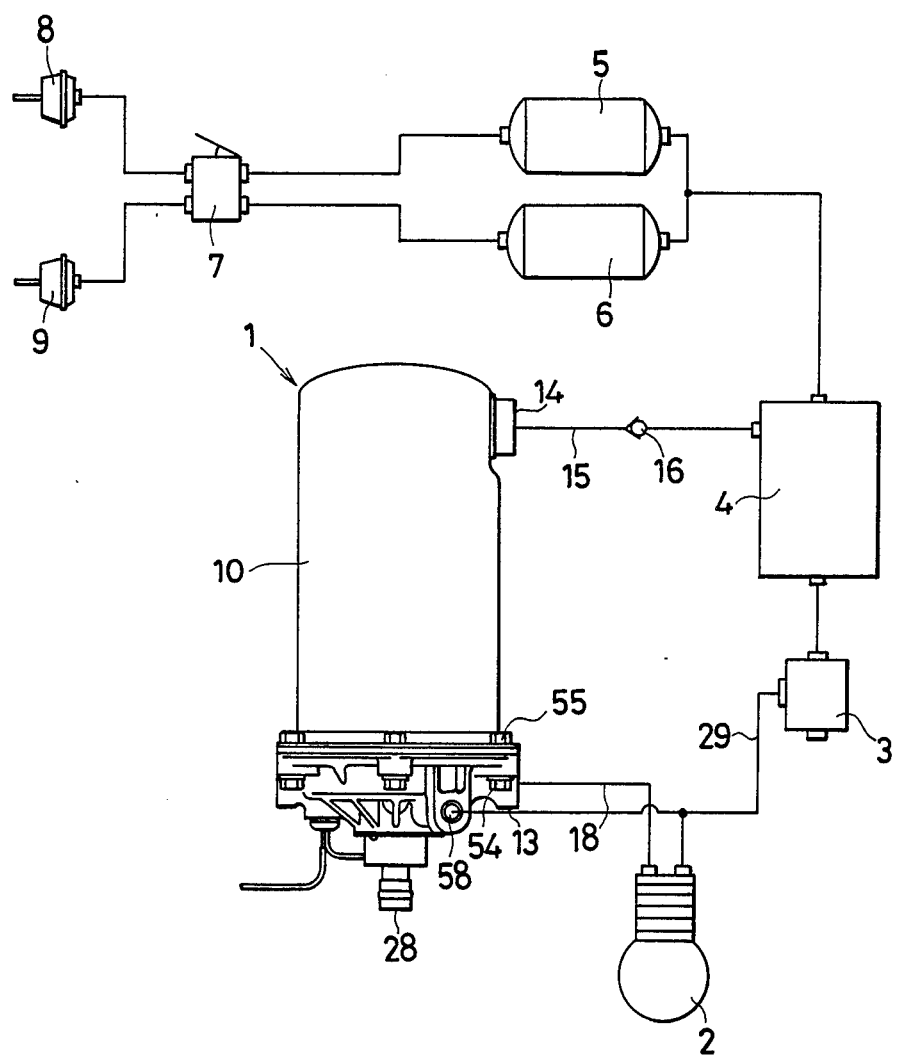
FIG. 1 is a schematic circuit diagram showing a general arrangement of an improved air drier apparatus according to the present invention as incorporated in a pneumatic brake system.

Referring firstly to FIG. 1, there is shown in a schematic general layout a pneumatic brake system for use in an automotive vehicle which incorporates an improved air drying apparatus 1, wherein there are provided an air compressor 2, a pressure regulator 3, an air storage tank 4, air reservoirs 5, 6, an air brake valve 7, and brake mechanisms 8, 9.

Figure 2:
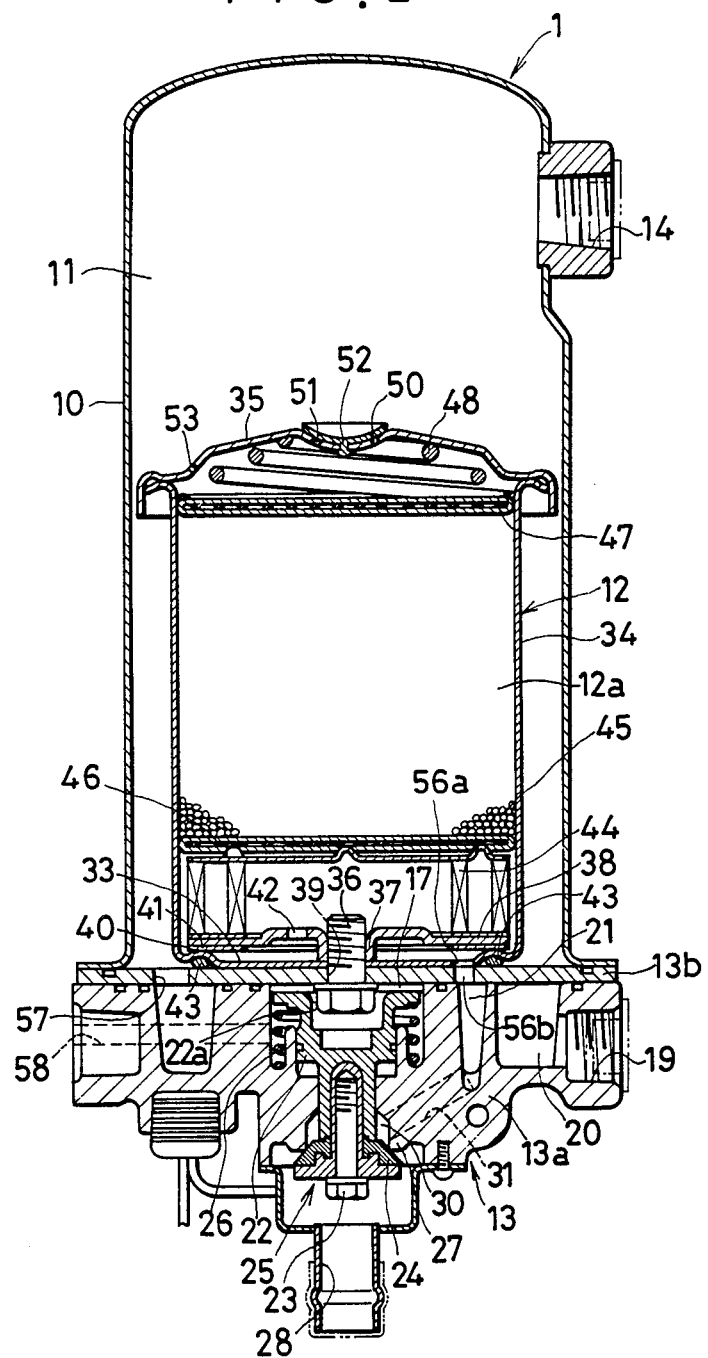
FIG. 2 is a longitudinal cross-sectional view showing an improved air drier apparatus according to the invention by way of a preferred embodiment thereof.

The air drying apparatus 1 comprises, as generally shown in FIG. 2, a drier housing 10 having an open bottom end, a drying agent storage casing 12 disposed in a purge chamber 11 defined within the housing 10, and a bottom end cover 13 for closing the open end of the housing 10. There is seen provided an outlet 14 for compressed air in the upper side wall of the housing 10, the outlet 14 being connected through a piping 15 and a check valve 16 to the air storage tank 4, as schematically shown in FIG. 1.

On the other hand, the bottom end cover 13 comprises a bottom cover unit 13a and a bottom end plate 13b. In this bottom cover unit 13a, there are provided a control chamber 17 defined generally in a central position of the unit, a compressed air inlet 19 connected through piping 18 to the compressor 2, and spiral paths 20, 21 defined in this inlet 19. There is disposed a discharge valve unit 25, which comprises a piston 22 mounted slidably in the control chamber 17 and a purging valve 24 mounted securely on one end of the piston 22 by using a set screw 23. The piston 22 is normally biased upwardly under the resilient force of a spring 26 in such a manner that the purging valve 24 may serve to rest snugly upon a valve seat 27 so as to cause an exhaust port 28 to be closed.

Also, the control chamber 17 communicates with a control port 58 which is connected to the air pressure regulator 3 by way of a piping 29, and a chamber 30 defined in the bottom cover unit 13a communicates with the spiral paths 20, 21 through a passageway 31. With this construction, it is arranged that when compressed air is supplied to the control port 58, the piston 22 is now caused to be pushed downwardly against the resilient force of the spring 26, so that the purging valve 24 may be forced to an open position.

The drying agent storage casing 12 consists of a cylindrical casing 34 having a closed bottom end 33 and a cap member 35 for closing the upper open end of the casing 34, and is designed to be fixed in position onto the bottom end plate 13b by using a securing plate member 38 including a lock nut fixed thereon and a bolt member 36. More specifically, the mounting of the drying agent storage casing 12 onto the bottom end cover 13 may be conducted with its closed bottom end 33 resting upon the bottom end plate 13b and with the securing plate member 38 having a lock nut 37 fixed and a through opening 42 disposed within the drying agent storage casing 12 in such a manner that the lock nut 37 upon a through opening 39 defined in the bottom end plate 13b may be screwed onto the bolt member 36 fixed on the part of the bottom end cover 13. The head portion of the bolt member 36 is seen rested securely in a recess 22a defined in the upper central portion of the piston 22. On the other hand, the outer circumferential portion of the securing plate member 38 incorporating the lock nut may be forced in close contact relationship with an annular ledge portion 40 defined in inner circumferential portion of the closed bottom end 33 of the casing 12 through a sandwiched plate member 41. Also, in a gap defined between an annular groove defined on the opposite side of the closed bottom end 33 in corresponding relationship with the annular ledge 40 around the bolt member 36 and the bottom end plate 13b, there is seen provided a resilient sealing ring member 43 of rubber, or the like.

In addition, there is securely disposed an oil filter member 44 upon the plate member 38 and in a drying agent storage chamber 12a of the casing 12, and also there are a pair of screens 46, 47 permeable to air mounted opposedly above the oil filter member 44, between which screens air drying agent 45 is charged. The upper screen element 47 is normally urged downwardly by function of a spring 48, whereby the air drying agent 45 may be placed in a desired close contact condition.

There is provided a pair of vent holes 50, 51 in the top of the cap member 35, and also there is a one-way check valve 52 urged resiliently in an opposed relationship with the pair of vent holes 50, 51. Also, defined is an orifice 53 in the cap member 35, through which the purging chamber 11 and the casing 12 may intercommunicate with each other.

On the other hand, as seen generally in FIG. 1, the bottom end cover 13 upon which the drying agent storage casing 12 is mounted is in turn jointed securely onto the housing 10 by way of the bottom end plate 13b and a plurality of screws 54 and nuts 55. In addition, there are provided through openings 56a, 56b in the opposed portions of the closed bottom end 33 of the casing 12 and the bottom end plate 13b of the bottom end cover 13, respectively, so as to intercommunicate with each other, and also an opening extending vertically in the bottom end plate 13b.

With such arrangement of the air drying apparatus 1 according to the present invention, it may serve in operation as follows.

In the compressed air charging stage of the pneumatic brake system, compressed air delivered from the air compressor 2 is firstly led into the inlet 19 of the air drying apparatus 1 through the air piping 18. Compressed air supplied at the inlet 19 is then directed to the spiral paths 20, 21, from where it passes through the oil filter member 44 and the air screens 46, 47 in succession by way of the through openings 56b, 56a. While passing through the oil filter member 44, air is filtered from dusts, oil mist, etc.

Thereafter, compressed air flows through air drying agent 45 and get dried while passing therethrough. Thus, dried-up air is then supplied into the purging chamber 11 from the vent holes 50, 51 through the check valve 52. When supplied into the purging chamber 11, compressed air is then redirected to the air storage tank 4 through the air outlet 14 of the housing 10 through the air piping 15 and the check valve 16. In this manner, compressed air delivered from the air compressor 2 is duly dried up by function of the air drying apparatus 1 and then stored in the air storage tank 4.

Now, when the pressure of air stored in the air storage tank 4 grows higher than an upper limit level, the pressure regulator 3 operates detecting that pressure level to stop the supply of compressed air from the air compressor 2 to the air storage tank 4, and then to supply compressed air to the control port 58 which communicates with the control chamber 17 of the air drying apparatus 1 through the air piping 29. This charge of compressed air now works upon the piston 22 in such a manner that the piston 22 may be urged downwardly against the resilient force of the spring 26. With this movement of the piston 22, the purging valve 24 may now be caused to depart away from its valve seat 27, causing the exhaust port 28 to be opened, thus making the chamber 30, the passageway 31 and the spiral air path 21 communicate with the atmosphere. With this arrangement, there is started a regeneration step of the drying agent 45.

In the drying agent regeneration stage, when the purging valve 24 is opened, compressed air within the drying agent storage casing 12 is now released in a gust from the exhaust port 28 to the atmosphere. At this moment, compressed air may flow rapidly entraining oils and the like caught by the drying agent 45 and/or deposited on the oil filter member 44 out of the system. At the same time, compressed air within the purging chamber 11 may flow into the casing 12 through the orifice 53 in the cap member 35, where it expands depriving the moisture of the drying agent 45, which may be carried outwardly through the exhaust port 28.

The air drying apparatus 1 of the construction by way of this embodiment of the invention is designed to recycle through the air supply stage and the drying agent regeneration stage, and when such operation of the apparatus is repeated during the use, there may possibly occur clogging in the oil filter member 44. In a worst condition with the conventional construction, compressed air cannot pass any longer through the oil filter member 44, building an excessive pressure within the drying agent storage casing 12 so much so that it would force the casing upwardly, which may eventually result in a threat to the safety of the air compressor 2 and its piping 29. In contrast, according to the improved mounting of the air drying apparatus as noted above, should there occur such an undesired condition in the casing 12 prior to the regular maintenance thereof, it is now possible that the sealing member 43 may be deformed somehow or get loose out of the engagement in position, making compressed air bypass the casing 12 so as to be introduced directly into the purging chamber 11, thus avoiding the threat to the safety of the compressed air apparatus, provided that there is served no longer air drying performance of the apparatus, which may of course be restored to a normal state in a following maintenance to be taken in the due course of time.

Now referring to the mounting of the drying agent storage casing 12 onto the bottom end cover 13, as the former is secured in position upon the latter with the employment of a single screw 36 and the securing plate member 38 with lock nut incorporated therein, there is naturally attainable such an advantageous effect that when replacing the drying agent 45 which is deteriorated (in an overhaul), the casing 12 can be mounted and dismounted with easy and within a short period of time.

In consideration of the fact that the securing plate member 38 incorporating lock nut therein may also serve a function as a reinforcement, it may accordingly share a strength in construction of the mount of the drying agent storage casing 12. As a consequence, therefore, it is possible in practice to have the material of the drying agent storage casing 12 thinner substantially in thickness, thus contributing to the reduction in weight of the casing 12.

Figure 3:
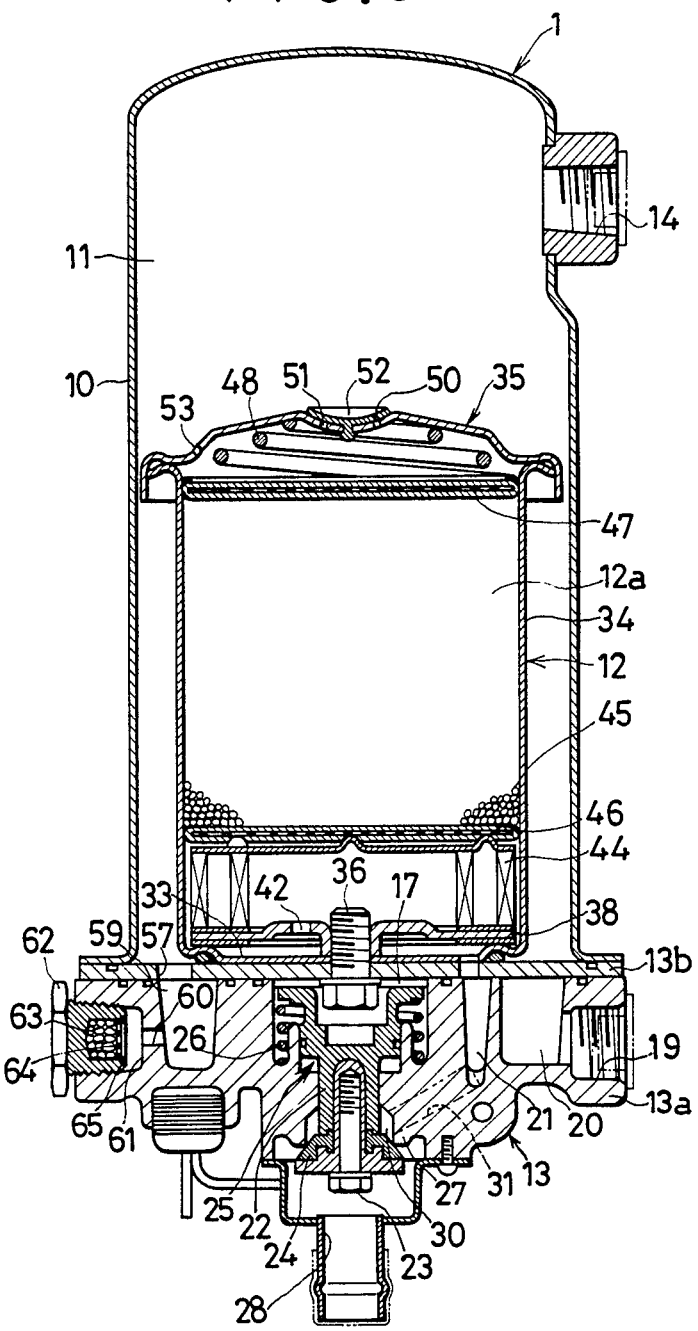
FIG. 3 is a longitudinal cross-sectional view showing an air drier apparatus by way of another embodiment of the invention.

Now, referring to FIG. 3, there is shown another embodiment of the invention, in which like parts are designated at like reference numerals, omitting the description of the same parts incorporated in the apparatus for the sake of clarity.

In FIG. 3, there are shown further provided an air storage recess 59 and another recess 61 communicating with the air storage recess 59 by way of a cross opening 60 extending therefrom, respectively in the bottom end cover 13.

There is inserted a plug 62 threaded into the recess 61, in which plug there is inserted a charge of silica gel 63 which may discolor when subjected to moisture. Silica gel 63 is held in position by using a perforated plate 64 and a snap ring 65 in such a manner that it may contact with compressed air within the purging chamber 11 by way of the cross opening 60, the air storage recess 59 and a longitudinal opening 57.

As stated hereinbefore, when the air drying apparatus 1 operates repeatedly in cycles of air supply and drying agent regeneration during the use, the drying agent 45 stored in the drying agent storage casing 12 would gradually get deteriorated reducing its hygroscopic property. As silica gel 63 held in the plug 62 is in the same emvironment as the drying agent 45 is placed, it is practicable to judge a current state of deterioration of the drying agent 45 from the degree of discoloring of silica gel 63 held in the plug 62 taken out of the recess 61. For instance, if silica gel 63 is found discolored in tint from blue to pink, it may then be known that the drying agent 45 has also been deteriorated, and it is now the time that the drying agent storage casing 12 may be replaced, accordingly.

Figure 4:
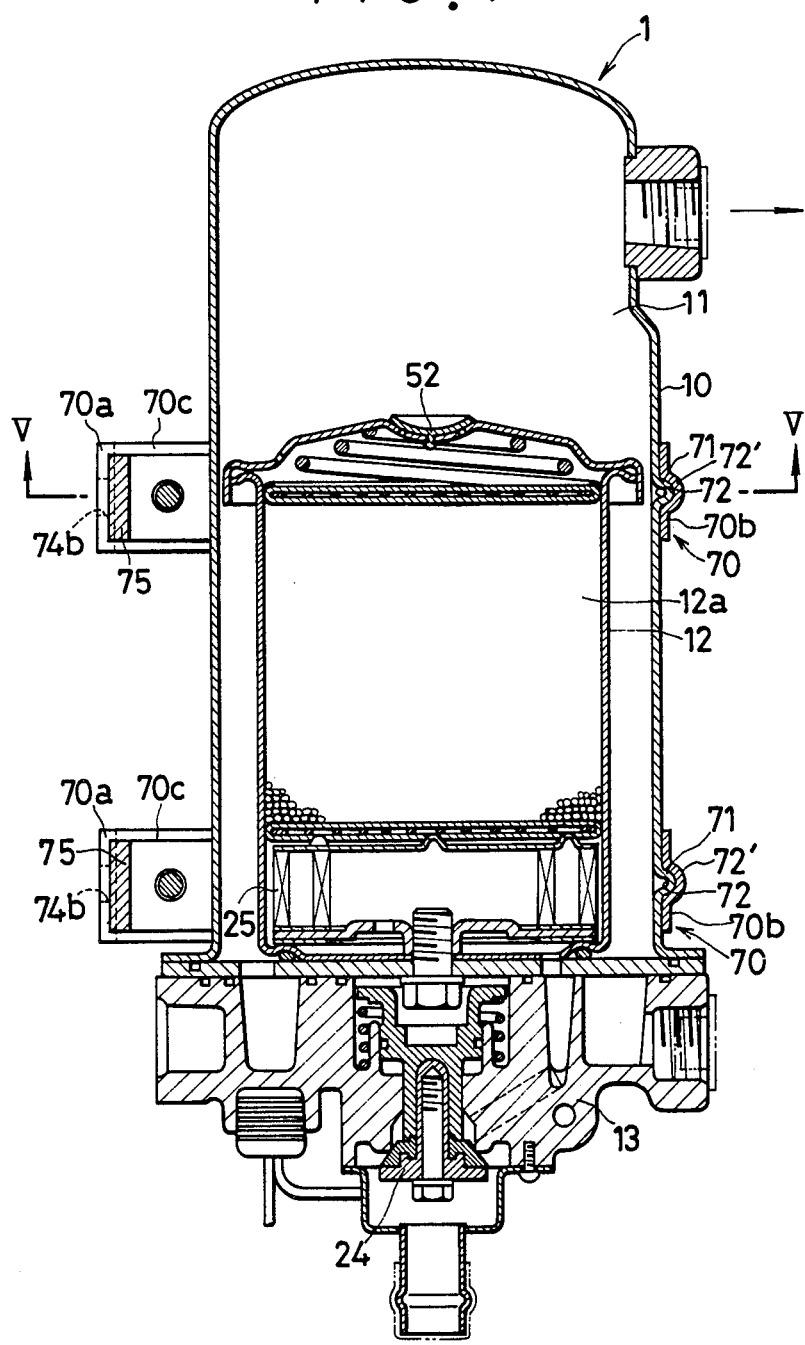
FIG. 4 is a similar cross-sectional view of an air drier apparatus by way of still another embodiment of the invention.
Figure 5:
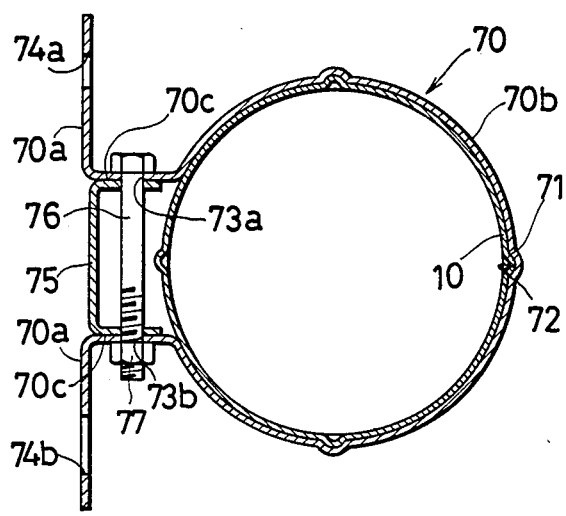
FIG. 5 is a transversal cross-sectional view taken along the line V—V in FIG. 4.

Next referring to FIGS. 4 through 6, there are shown still further embodiments of the invention, in which like parts are designated at like reference numerals, omitting the description of the same parts incorporated in the apparatus.

Figure 8:
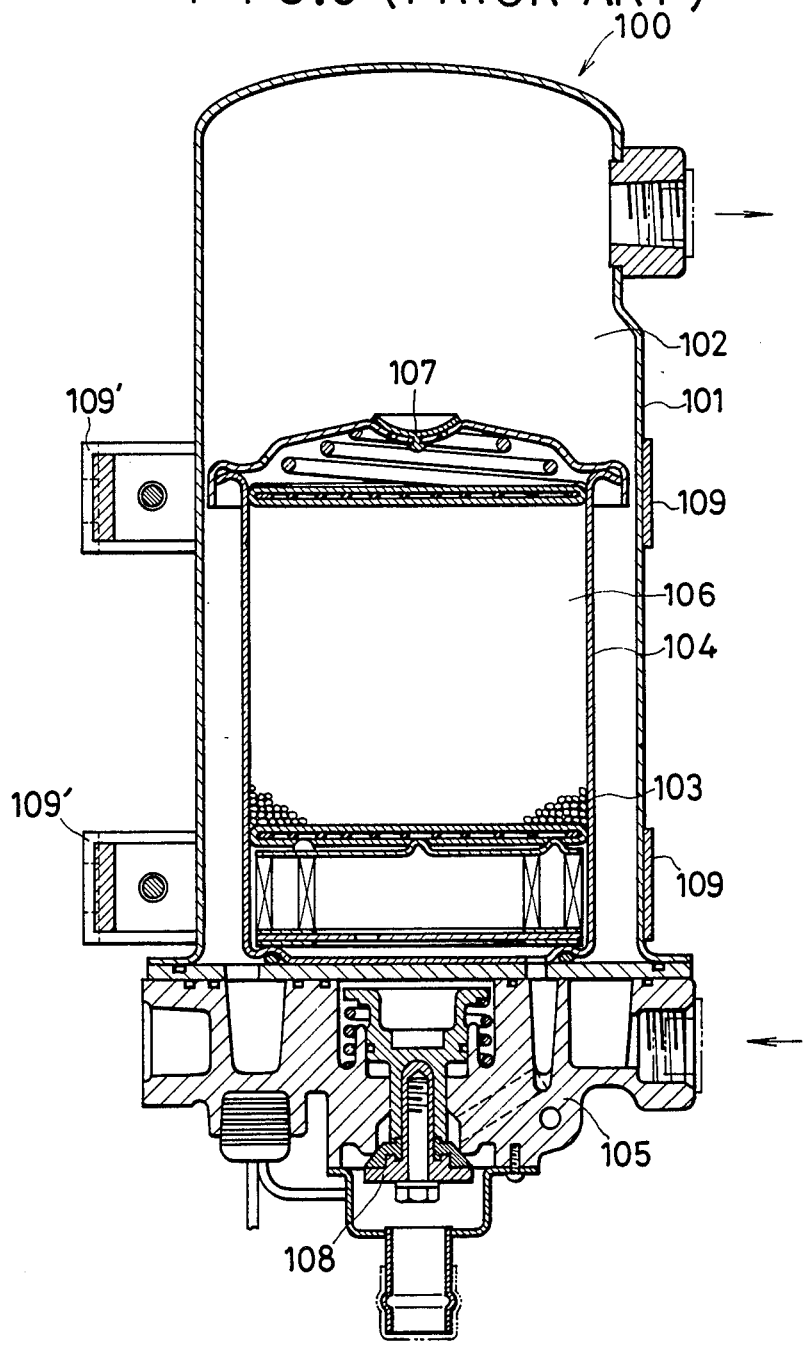

When mounting the air drying apparatus 1 onto the vehicle's proper, it may be mounted in position by using two belt-like fixing members 70 wrapped once around the circumference of the cylindrical housing 10, as done in the conventional practice shown in FIG. 8, with the opposite ends thereof being secured together by using screws and nuts, and then with thus-secured ends of the mounting members 70 being mounted in position on the vehicle's proper by using bolts and nuts to be fixed securely.

Figure 6A:
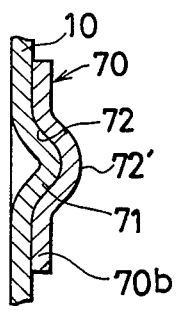
FIG. 6(a) is a fragmentary enlarged view showing the main portion of the air drier apparatus according to the invention.

According to this embodiment, as shown typically in FIGS. 4 and 6(a), there are formed by press projections 71 distributed along the outer circumference of the housing 10 and also an annular groove 72 formed on the inner circumference of the belt-like fixing member 70, which is complementary with the annular ledge 71 on the housing. More specifically, the above mentioned projections 71 consist of dot shape (or pointed projections), which are provided in plurality, for example four of such projections at an equal space around from each other around the outer circumference of the housing 10.

As shown in FIG. 5, the above mentioned fixing member 70 is of an elongated web or belt which is curved to a circle shape, which comprises a pair of opposite end tabs 70a, a middle annular portion 70b, and a pair of opposed portions 70c formed between the both ends of the annular portion 70b and the pair of end tabs 70a. There are provided bolt opening 73a, 73b in the pair of opposed portions 70c, and mount holes 74a, 74b formed in the opposite end tabs 70a bent in the opposite directions, respectively.

When mounting the air drying apparatus 1 onto the vehicle's proper, etc., the annular portion 70b of the fixing member 70 is firstly mounted around the housing 10 in wrapping fashion as shown in FIG. 5, with the projections 71 on the part of the housing 10 and the complementary groove 72 on the part of the fixing member 70 mating with each other. In addition, there is an intermediate member 75 having a generally C-shaped cross-sectional shape disposed across the pair of opposed portions 70c of the fixing member 70, and then jointed all together by using bolts 76 and nuts 77 in such a manner that the intermediate member 75 may be secured in a bridge fashion between the opposed portion 70c. With such arrangement, when assembled around the housing 10, the housing 10 and the annular portion 70b of the fixing member 70 are put to be fixed together in position, with the projections 71 and the groove 72 mating with each other in a complementary relationship. Next, thus-assembled air drying apparatus 1 may be secured at the opposite end portions 70a of the fixing member 70 in position on the vehicle's proper by using bolts and nuts not shown.

When the air drying apparatus 1 is fixed upon the vehicle's proper, there is no fear of loose mount of the apparatus out of the fixing member 70 by virtue of such an assured engagement between the projections 71 and the mating groove 70 according to the present invention.

In addition, the provision of the groove 72 on the part of the fixing member 70 formed by the press work is, in other words, the provision of the ledge 72' on the side opposite the housing 10, which may add the strength of the fixing member 70 with the employment of this annular ledge 72' therein.

While the present invention has been shown by way of preferred embodiments thereof, it should be noted that the invention should not be restricted to such embodiments, and that many other variations and modifications may be made without departing from the spirit and scope of the invention, as described in the specification and defined in the appended claims.

For example, while the present invention is explained by way of preferred embodiments thereof particularly in connection with the pneumatic brake system for use in an automotive vehicle, it is of course possible to adapt the same to many other applications. While there is shown a preferred embodiment wherein silica gel 63 is used as means for judging the degree of deterioration of drying agent 45, any other drying agent may be used for this purpose. Also, in one embodiment raised herein, while the plug 62 is installed in the bottom end cover 13, it may naturally be mounted on the housing 10, and any other means than the plug 62 may also be adapted to an equal effect.

While there are formed four groups of point projections around the outer circumference of the housing 10 in still another embodiment of the invention, there is actually no limit in the number of such projections, but it is of course practicable to provide a series of annular projections all around the circumference of the housing 10.

Figure 6B:
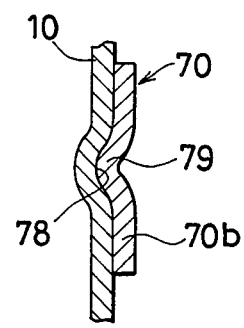
FIG. 6(b) is a fragmentary enlarged view showing the main portion of the air drier apparatus by way of modification.
Figure 7:
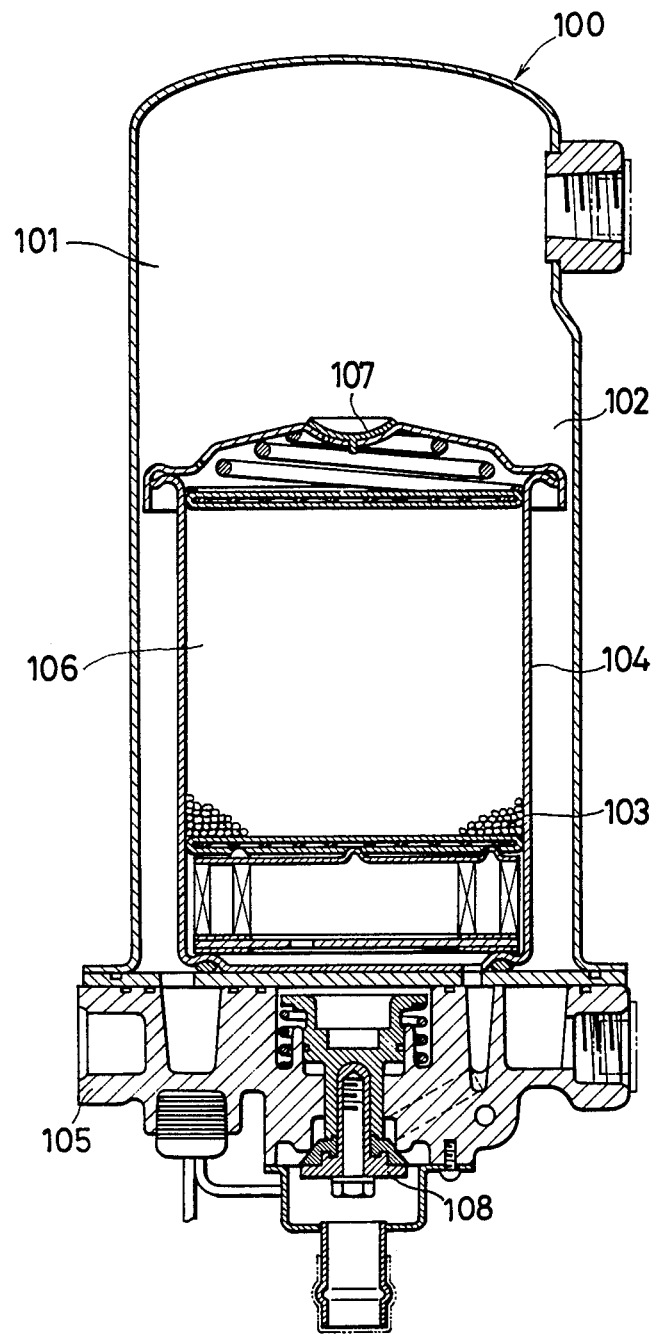
FIGS. 7 and 8 are general longitudinal cross-sectional views showing the typical constructions of conventional air drier apparatus.

In addition, it is also practicable as shown in FIG. 6(b) that there may be formed an annular groove 78 on the part of the housing 10 and a complementary ledge 79 on the part of the fixing member 70 so as to mate with each other.

As fully described herein, by virtue of the employment of single bolt and nut to mount the bottom portion of the drying agent storage casing onto the bottom end cover, when dismounting the air drying apparatus 1 for replacing the drying agent, the casing can be disassembled easily and within a short period of time, which may substantially contribute to the curtailment of overhaul services.

Also, by virtue of the employment of the securing plate member 38 incorporating lock nut therein which may add the strength of the casing structure, the casing can be formed from a relatively thin material, thus contributing to the reduction in weight of the apparatus.

Furthermore, as the air drying apparatus 1 according to the present invention is disposed with the member containing the moisture sensing means disposed in immediate contact with compressed air within the purging chamber, it is advantageous that the current degree of deterioration of the drying agent within the drying agent storage casing can be checked by taking out the moisture sensing means only without disassembling the casing of the air drier apparatus. Consequently, it is now possible to readily judge the state of deterioration of the drying agent at the time of regular maintenance service, without any occasions of unnecessary replacement of the drying agent storage casing, thus making full use of the hydroscopic property of the drying agent, and thus contributing to the economy in maintenance.

In addition, by virtue of the employment of the complementary engagement by way of the annular ledge and groove provided on the housing and the fixing member of the air drying apparatus, it may contribute to a positive mount of the casing which prevents the apparatus from loose mount or slipping in the use. Furthermore, this arrangement may also contribute to the increase in strength of the fixing member.

While the present invention has been described in detail by way of specific preferred embodiments thereof, it is to be understood that the present invention is not intended to be restricted to the details of the specific constructions shown in the preferred embodiments, but to the contrary, the present invention can of course be practiced in many other arrangements to an equal advantageous effect in accordance with the foregoing teachings without any restriction thereto and without departing from the spirit and scope of the invention.

It is also to be understood that the appended claims are intended to cover all of such generic and specific features particular to the invention as disclosed herein and all statements relating to the scope of the invention, which as a matter of language might be said to fall thereunder.

What is claimed is:

1. In an air drier apparatus including a housing having an open bottom end, a drying agent storage casing disposed within said housing, and a bottom end cover blocking the open bottom end of said housing, said air drier apparatus being adapted to dry compressed air supplied through an air inlet port formed on said bottom end cover with drying agent charged within said casing; the improvement whereby the bottom portion of said drying agent storage casing is mounted securely upon said bottom end cover, said improvement comprising, in combination, a securing plate means positioned within said bottom portion of said drying agent storage casing, said securing plate means having a lock nut incorporated thereon and a single bolt means engaging said lock nut and clamping said bottom portion of said drying agent storage casing to said bottom end cover.

2. An air drier apparatus as claimed in claim 1, wherein a plug holding moisture sensing means therein is removably disposed within said housing or said bottom end cover in such a manner that said moisture sensing means is exposed to contact with said compressed air existing in said purge chamber.

3. An air drier apparatus as claimed in claim 2, wherein said moisture sensing means is silica gel which may discolor upon the absorption of moisture.

4. An air apparatus as claimed in claim 2, wherein said moisture sensing means is operatively in position within said plug by using perforated plate means and snap ring means which serve together.

5. An air drier apparatus as claimed in claim 1, wherein a belt-like fixing means is provided for mounting said air drier apparatus, said housing being provided with projection or recess means in the outer circumference thereof and said fixing means being provided with a complementary recess or projection means in the inner circumference thereof, respectively, whereby said fixing means may be placed around said housing with said projection and recess means of said both housing and fixing means mated snugly with each other in such a manner that said fixing means may be secured in complementary engaging relationship with said housing.

6. An air drier apparatus as claimed in claim 5, wherein said projection means provided in the outer circumference of said housing or in the inner circumference of said fixing means consists of a plurality of dot or pointed projections disposed at an equal interval.

7. An air drier apparatus as claimed in cliam 5, wherein said projection means provided in the outer surface of said housing or in the inner surface of said fixing means is formed with a series of ledges extending in continuity.

8. In an air drier apparatus including a housing having an open bottom end, a drying agent storage casing having a check valve therein and disposed within said housing, a bottom end cover having a compressed air inlet port and blocking the open bottom end of said housing, and a purge chamber defined between said housing and said drying agent storage casing, said air drier apparatus being adapted to dry compressed air supplied through said compressed air inlet port by allowing said compressed air to contact with drying agent charged within said drying agent storage casing, and being adapted to direct thus dried-up compressed air into air reservoir means passing through said check valve and said purge chamber; the improvement which comprises in combination: a removable plug disposed within said housing or said bottom end cover and moisture sensing means positioned in said plug in such a manner that said moisture sensing means is exposed to contact with said compressed air existing in said purge chamber, the arrangement being such that said plug can be easily removed from within the said housing or said bottom end cover without disassembling any other parts of said air drier apparatus.

9. An air drier apparatus as claimed in claim 8, wherein said moisture sensing means is silica gel which may discolor upon the absorption of moisture.

10. An air drier apparatus as claimed in claim 8, wherein said moisture sensing means is held operatively in position within said holding means by using perforated plate means and snap ring means which serve together.

11. In an air drier apparatus including a housing having an open bottom end, a drying agent storage casing disposed within said housing, and a bottom end cover blocking the open end of said housing, said air drier apparatus being adapted to dry compressed air supplied through an air inlet port formed on said bottom end cover with drying agent charged within said casing; the improvement whereby the bottom portion of said drying agent storage casing is mounted securely upon said bottom end cover, said improvement comprising, in combination, a securing plate means positioned within said bottom portion of said drying agent storage casing and having a lock nut incorporated thereon, an intermediate plate means positioned between said securing plate means and the inner circumferential portion of the closed bottom of said drying agent storage casing and single bolt means engaging said lock nut and forcing said intermediate plate means oppositely upon said inner circumferential portion of the closed bottom of said storage casing to thereby clamp the same in position onto said bottom end cover.

* * * * *